United States Patent
Danziger et al.

(10) Patent No.: US 9,462,037 B2
(45) Date of Patent: Oct. 4, 2016

(54) DYNAMICALLY SIZING CHUNKS IN A PARTIALLY LOADED SPREADSHEET MODEL

(71) Applicant: Google Inc., Mountain View, CA (US)

(72) Inventors: Joshua Ari Danziger, Metuchen, NJ (US); Amod Karve, Clifton, NJ (US); Zachary Erik Lloyd, Brooklyn, NY (US); Yossi Kahlon, Montclair, NJ (US); Micah Lemonik, Great Neck, NY (US)

(73) Assignee: Google Inc., Mountain View, CA (US)

( * ) Notice: Subject to any disclaimer, the term of this patent is extended or adjusted under 35 U.S.C. 154(b) by 471 days.

(21) Appl. No.: 13/735,377

(22) Filed: Jan. 7, 2013

(65) Prior Publication Data
US 2015/0195375 A1    Jul. 9, 2015

(51) Int. Cl.
| | |
|---|---|
| *G06F 15/16* | (2006.01) |
| *H04L 29/08* | (2006.01) |
| *G06F 17/22* | (2006.01) |
| *G06F 17/24* | (2006.01) |

(52) U.S. Cl.
CPC .......... *H04L 67/06* (2013.01); *G06F 17/2288* (2013.01); *G06F 17/246* (2013.01); *H04L 67/1002* (2013.01)

(58) Field of Classification Search
CPC .............. H04L 67/42; H04L 67/1002; H04L 65/1097; G06F 7/00; G06F 11/1448
See application file for complete search history.

(56) References Cited

U.S. PATENT DOCUMENTS

| | | |
|---|---|---|
| 5,528,743 A | 6/1996 | Tou et al. |
| 5,758,358 A | 5/1998 | Ebbo |
| 5,761,669 A | 6/1998 | Montague et al. |
| 5,793,966 A | 8/1998 | Amstein et al. |
| 5,895,476 A | 4/1999 | Orr et al. |
| 5,930,813 A | 7/1999 | Padgett et al. |
| 6,006,239 A | 12/1999 | Bhansali et al. |
| 6,049,664 A | 4/2000 | Dale et al. |
| 6,169,999 B1 | 1/2001 | Kanno |
| 6,243,706 B1 | 6/2001 | Moreau et al. |
| 6,327,584 B1 | 12/2001 | Xian et al. |
| 6,330,046 B1 | 12/2001 | Ishitaka et al. |
| 6,341,305 B2 | 1/2002 | Wolfe |
| 6,342,906 B1 | 1/2002 | Kumar et al. |
| 6,377,354 B1 | 4/2002 | Nguyen et al. |

(Continued)

OTHER PUBLICATIONS

Bibi et al., "A Platform for Delivering Multimedia Presentations on Cultural Heritage," 2010 14th Panhellenic Conference on Informatics, pp. 175-179.

(Continued)

*Primary Examiner* — Yves Dalencourt
(74) *Attorney, Agent, or Firm* — Ropes & Gray LLP (57) ABSTRACT

A method for managing a dynamically-sized chunked spreadsheet model on a server includes creating, on the server, a plurality of chunks representing a spreadsheet, where a first chunk in the plurality of chunks includes a first range of cells in the spreadsheet. The method further includes storing on the server a mutation log for the spreadsheet, and receiving a first plurality of mutations from a plurality of client computers, where the first plurality of mutations are stored in the mutation log. The method further includes applying the first plurality of mutations to the first chunk in response to a first client computer in the plurality of client computers requesting the first range of cells, and sending the first chunk to the first client computer.

22 Claims, 6 Drawing Sheets

(56) References Cited

U.S. PATENT DOCUMENTS

| | | |
|---|---|---|
| 6,418,441 B1 | 7/2002 | Call |
| 6,501,779 B1 | 12/2002 | McLaughlin et al. |
| 6,512,531 B1 | 1/2003 | Gartland |
| 6,662,210 B1 | 12/2003 | Carleton et al. |
| 6,705,584 B2 | 3/2004 | Hiroshima et al. |
| 6,717,593 B1 | 4/2004 | Jennings |
| 6,737,289 B2 | 5/2004 | Woo et al. |
| 6,879,997 B1 | 4/2005 | Ketola et al. |
| 6,967,704 B2 | 11/2005 | Hoshino |
| 6,972,748 B1 | 12/2005 | Lang |
| 6,983,416 B1 | 1/2006 | Bae et al. |
| 7,009,626 B2 | 3/2006 | Anwar |
| 7,026,100 B2 | 4/2006 | Nakata et al. |
| 7,031,954 B1 | 4/2006 | Kirsch |
| 7,035,910 B1 | 4/2006 | Dutta et al. |
| 7,039,643 B2 | 5/2006 | Sena et al. |
| 7,231,597 B1 | 6/2007 | Braun et al. |
| 7,233,951 B1 | 6/2007 | Gainer et al. |
| 7,287,094 B2 | 10/2007 | Mogul |
| 7,437,421 B2 | 10/2008 | Bhogal et al. |
| 7,478,330 B1 | 1/2009 | Branson et al. |
| 7,487,448 B2 | 2/2009 | Emerson et al. |
| 7,491,399 B2 | 2/2009 | Vakharia |
| 7,529,778 B1 | 5/2009 | Dewey et al. |
| 7,624,145 B2 | 11/2009 | Junuzovic et al. |
| 7,656,543 B2 | 2/2010 | Atkins |
| 7,680,932 B2 | 3/2010 | Defaix et al. |
| 7,698,379 B2 | 4/2010 | Dutta et al. |
| 7,712,016 B2 | 5/2010 | Jones et al. |
| 7,774,703 B2 | 8/2010 | Junuzovic et al. |
| 7,792,788 B2 | 9/2010 | Melmon et al. |
| 7,836,148 B2 | 11/2010 | Popp et al. |
| 7,890,928 B2 | 2/2011 | Patrudu |
| 7,920,240 B2 | 4/2011 | Yonemura |
| 7,953,696 B2 | 5/2011 | Davis et al. |
| 7,958,448 B2 | 6/2011 | Fattic, II et al. |
| 7,983,416 B2 | 7/2011 | Takashima et al. |
| 8,019,780 B1 | 9/2011 | Pinkerton et al. |
| 8,044,961 B2 | 10/2011 | Opstad et al. |
| 8,065,604 B2 | 11/2011 | Blankinship |
| 8,073,812 B2 | 12/2011 | Curtis et al. |
| 8,327,127 B2 | 12/2012 | Suryanarayana et al. |
| 8,327,812 B2 | 12/2012 | Vuk |
| 8,395,733 B2 | 3/2013 | Ataka et al. |
| 2001/0033917 A1 | 10/2001 | Sogabe et al. |
| 2002/0032701 A1 | 3/2002 | Gao et al. |
| 2002/0035580 A1 | 3/2002 | Tanabe |
| 2002/0091747 A1* | 7/2002 | Rehg et al. .......... 709/107 |
| 2002/0095399 A1 | 7/2002 | Devine et al. |
| 2002/0133492 A1 | 9/2002 | Goldstein et al. |
| 2002/0174085 A1 | 11/2002 | Nelson et al. |
| 2003/0009603 A1 | 1/2003 | Ruths et al. |
| 2003/0014406 A1 | 1/2003 | Faieta et al. |
| 2003/0014513 A1 | 1/2003 | Ruths et al. |
| 2003/0018719 A1 | 1/2003 | Ruths et al. |
| 2003/0037076 A1 | 2/2003 | Bravery et al. |
| 2003/0037303 A1 | 2/2003 | Bodlaender et al. |
| 2003/0084078 A1 | 5/2003 | Torii et al. |
| 2003/0115268 A1 | 6/2003 | Esposito |
| 2003/0179230 A1 | 9/2003 | Seidman |
| 2004/0015781 A1 | 1/2004 | Brown et al. |
| 2004/0044965 A1 | 3/2004 | Toyama et al. |
| 2004/0085354 A1 | 5/2004 | Massand |
| 2004/0088374 A1 | 5/2004 | Webb et al. |
| 2004/0088653 A1 | 5/2004 | Bell et al. |
| 2004/0133444 A1 | 7/2004 | Defaix et al. |
| 2004/0215672 A1 | 10/2004 | Pfitzner |
| 2004/0215825 A1 | 10/2004 | Pfitzner |
| 2004/0215826 A1 | 10/2004 | Pfitzner |
| 2004/0216090 A1 | 10/2004 | Kaler et al. |
| 2005/0091291 A1 | 4/2005 | Kaler et al. |
| 2005/0125461 A1 | 6/2005 | Filz |
| 2005/0131887 A1 | 6/2005 | Rohrabaugh et al. |
| 2005/0185636 A1 | 8/2005 | Bucher |
| 2005/0200896 A1 | 9/2005 | Narusawa et al. |
| 2005/0234943 A1 | 10/2005 | Clarke |
| 2006/0031751 A1 | 2/2006 | Ehud |
| 2006/0075332 A1 | 4/2006 | Fairweather et al. |
| 2006/0101071 A1 | 5/2006 | Henderson |
| 2006/0200755 A1 | 9/2006 | Melmon et al. |
| 2006/0230344 A1 | 10/2006 | Jennings et al. |
| 2006/0248121 A1 | 11/2006 | Cacenco et al. |
| 2007/0033654 A1 | 2/2007 | Wilson |
| 2007/0061714 A1 | 3/2007 | Stuple et al. |
| 2007/0070066 A1 | 3/2007 | Bakhash |
| 2007/0073899 A1 | 3/2007 | Judge et al. |
| 2007/0094601 A1 | 4/2007 | Greenberg et al. |
| 2007/0186157 A1 | 8/2007 | Walker et al. |
| 2007/0208992 A1 | 9/2007 | Koren |
| 2007/0220068 A1 | 9/2007 | Thompson et al. |
| 2007/0233811 A1 | 10/2007 | Rochelle et al. |
| 2007/0239695 A1 | 10/2007 | Chakra et al. |
| 2007/0279572 A1 | 12/2007 | Yonemura |
| 2007/0288637 A1 | 12/2007 | Layton et al. |
| 2007/0299857 A1 | 12/2007 | Gwozdz et al. |
| 2008/0028302 A1 | 1/2008 | Meschkat |
| 2008/0040659 A1 | 2/2008 | Doyle |
| 2008/0059539 A1 | 3/2008 | Chin et al. |
| 2008/0082604 A1 | 4/2008 | Mansour et al. |
| 2008/0126943 A1 | 5/2008 | Parasnis et al. |
| 2009/0112990 A1 | 4/2009 | Campbell et al. |
| 2009/0192845 A1 | 7/2009 | Gudipaty et al. |
| 2009/0235181 A1 | 9/2009 | Saliba et al. |
| 2009/0276455 A1 | 11/2009 | Yu et al. |
| 2009/0328063 A1 | 12/2009 | Corvera et al. |
| 2010/0030578 A1 | 2/2010 | Siddique et al. |
| 2010/0083096 A1 | 4/2010 | Dupuis-Latour et al. |
| 2010/0107048 A1 | 4/2010 | Takahara |
| 2010/0153948 A1 | 6/2010 | Schreiber et al. |
| 2010/0218099 A1 | 8/2010 | van Melle et al. |
| 2010/0235763 A1 | 9/2010 | Massand |
| 2010/0241749 A1 | 9/2010 | Rasmussen et al. |
| 2010/0245256 A1 | 9/2010 | Estrada et al. |
| 2010/0251122 A1 | 9/2010 | Lee et al. |
| 2011/0055329 A1 | 3/2011 | Abt, Jr. et al. |
| 2011/0066957 A1 | 3/2011 | Prats et al. |
| 2011/0085211 A1 | 4/2011 | King et al. |
| 2011/0154185 A1 | 6/2011 | Kern et al. |
| 2011/0178981 A1 | 7/2011 | Bowen et al. |
| 2011/0252300 A1 | 10/2011 | Lloyd et al. |
| 2011/0252339 A1 | 10/2011 | Lemonik et al. |
| 2011/0302194 A1* | 12/2011 | Gonzalez et al. ............ 707/769 |
| 2011/0302237 A1 | 12/2011 | Knight et al. |
| 2012/0072819 A1 | 3/2012 | Lindner et al. |
| 2012/0110445 A1 | 5/2012 | Greenspan et al. |
| 2012/0159298 A1 | 6/2012 | Fisher et al. |
| 2012/0331373 A1 | 12/2012 | Lindner et al. |
| 2013/0007183 A1* | 1/2013 | Sorenson et al. ............ 709/213 |
| 2013/0159832 A1 | 6/2013 | Ingargiola et al. |
| 2013/0262974 A1* | 10/2013 | Anstis .................. G06F 17/246 |
| | | 715/217 |

OTHER PUBLICATIONS

Ellis et al., "Concurrency Control in Groupware Systems," ACM 1989, pp. 399-407.

Huang et al., "A General Purpose Virtual Collaboration Room," Google 1999, pp. 1-9.

Pacull et al., "Duplex: A Distributed Collaborative Editing Environment in Large Scale," ACM 1994, pp. 165-173.

Cairns et al., "System and Method of Document Embedding in Collaborative Editors," unpublished U.S. Appl. No. 13/493,672, filed Jun. 11, 2012, 1-48.

Ellis et al., Groupware Some Issues and Experiences, Communications of the Association for Computing Machinery, ACM, 34:1, Jan. 1, 1991,38-58.

Cairns, "System and Method of Secure Communication Between Multiple Child Frames," unpublished U.S. Appl. No. 13/493,798, filed Jun. 11, 2012, 1-47.

Day-Richter et al., "System and Method for Managing Remote Procedure Calls Relating to a Third Party Software Application," unpublished U.S. Appl. No. 13/591,851, filed Aug. 22, 2012, pp. 1-98.

(56) References Cited

OTHER PUBLICATIONS

Day-Richter et al., "System and Method for Performing Data Management in a Collaborative Development Environment," unpublished U.S. Appl. No. 13/591,734, filed Aug. 22, 2012, pp. 1-101.
Grieve et al., "Systems and Methods for Collaborative Document Editing," unpublished U.S. Appl. No. 13/297,762, filed Nov. 16, 2011, pp. 1-49.
Kjaer, "Timing and Synchronization in JavaScript", Dev. Opera, Sections:"The Basics", "Event Queing", "Long Running Scripts" and "Advice on Timing", Feb. 27, 2007, downloaded from URL: http/dev.opera.com/articles/view/timing-and-synchronization-injavascript/, pp. 1-9.
Lemonik et al., "System and Method for Providing Data Management Services," unpublished U.S. Appl. No. 13/224,860, filed Sep. 2, 2011, pp. 1-88.
Lemonik et al., "System and Method for Using a Third-Party Add-On in a Collaborative Online Software Development Environment," unpublished U.S. Appl. No. 13/551,859, filed Jul. 18, 2012, 1-103.
Lemonik et al., "System and Method for Providing Access to a Document Associated with a Third Party Software Application Via Interframe Communication," unpublished U.S. Appl. No. 13/224,769, filed Sep. 2, 2011, pp. 1-90.
Lemonik et al., "System and Method for Providing Real-Time Collaborative Document Editing Services," unpublished U.S. Appl. No. 13/224,573, filed Sep. 2, 2011, pp. 1-90.
Lemonik et al., "System and Method for Updating an Object Instance Based on Instructions Received from Multiple Devices," unpublished U.S. Appl. No. 13/282,636, filed Oct. 17, 2011, pp. 1-91.
Lemonik et al., "System and Method for Updating an Object Instance Based on Instructions Received from Multiple Devices," unpublished U.S. Appl. No. 13/224,479, filed Sep. 2, 2011, pp. 1-91.
Lemonik et al., "System and Method for Using a Third-System and Method for Using a Third-Party Add-On to Manipulate a Document in a Collaborative Online Software Development Environment," unpublished U.S. Appl. No. 13/551,772, filed Jul. 18, 2012, 1-119.
Lemonik et al., "System and Method to Provide Collaborative Document Processing Services Via Interframe Communication," unpublished U.S. Appl. No. 13/224,663, filed Sep. 2, 2011, pp. 1-90.
Pereira et al., Merging Electronic Document Redraws, unpublished U.S. Appl. No. 13/282,753, filed Oct. 27, 2011, pp. 1-30.
Pereira et al., Merging Electronic Document Redraws, unpublished U.S. Appl. No. 13/006,259, filed Jan. 13, 2011, pp. 1-30.
Quinn, "Comparing Online vs. Traditional Office Software, Will desktop or online office software fit your non-profit needs best?" May 21, 2010, courtesy of Idealware, TechSoup.org [online]. Retrieved from the Internet L:http://www.techsoup.org/learning.center/software/page11852.cfm (4 pp.).
Sun et al., "Operational Transformation in Real-Time Group Editors: Issues, Algorithms, and Achievements," 1998, ACM Conference on Computer-Supported Cooperative Work, pp. 1-10.
Shen et al., "Flexible Merging for Asynchronouse Collaborative Systems," Griffith University, School of Computing an Information Technology, Brisbane, Australia 2002 (18 pages).
Tyson, Herb, "Microsoft Word 2007 Bible," 2007, pp. 112-115, p. 467, pp. 523-525, p. 798.
Wikipedia, the free encyclopedia, "Model-View-Controller," downloaded on Nov. 16, 2010 [online]. Retrieved from the Internet: URL:http://en.wikipedia.org/wiki/Modei%E2%80%93view%E2%80%93controller, pp. 1-10.
Citro, "Conflict Management for Real-Time Collaborative Editing in Mobile Replicated Architectures," 2007, Australian Computer Society, Inc., Thirteenth Austrailian Computer Science Conference (ACSC2007), pp. 115-124.
Conner, Zoho 4 Everyone, 2008, downloaded from the internet http://techbus.safaribooksonline.com/print?xmlid=9780768687835/ch011ev1 sec1, Aug. 21, 2012, p. 1-17.
DeJean, David, "Online office apps get real: Google Docs vs. ThinkFree vs. Zoho, Web-based suites have become real challengers to desktop applications," Jul. 16, 2008, Computerworld [online]. Retrieved from the Internet: <URL: http://www.computerworld.com/s/article/pri nt/91 08799/0n line_ office_ apps get_real_ Google D ocs vs ThinkFree vs. Zoho> (7 pp.).
Wikipedia, "Operational Transformation," http://en.wikipedia.org/wiki/Operation_transformation, Jun. 3, 2008. Retrieved from Internet: http://web.archive.org/web/20080603061805/http://en.wikipedia.org/wiki/Operational_transformation.
Unpublished U.S. Appl. No. 13/224,530, filed Sep. 2, 2011.
Unpublished U.S. Appl. No. 13/274,382, filed Oct. 17, 2011.
Unpublished U.S. Appl. No. 13/166,844, filed Jun. 23, 2011.
Wang et al. Google Wave Operational Transformation, Jul. 1, 2010, 1-6, retrieved from the Internet Feb. 14, 2012: http:/1 wave-protocol.googlecode.comfhg/Whitepapers/operational-transform/operational-transform.html.
Googlepedia: The Ultimate Google Resource, Third Edition, pp. 276-287 (2008).
Hodel et al., "Supporting Collaborative Layouting in Word Processing," University of Zurich, Department of lnforamtics; Zurich, Switzerland, 2004 (18 page).
Holzer, "Google Docs 4 Everyone" http://www.scribd.com/doc/14119795/Google-Docs-4-Everyone Published Feb. 2009.
Ignat et al., "Awareness of Concurrent Changes in Distributed Software Development," Nancy-Universite, France 2008 (9 pages).
Ignat et al., "CoDoc: Multi-mode Collaboration over Docuemtns," ETII Surich,Institute for Information Systems; Zurich, Switzerland, 2004 (15 pages).
Raman, "Cloud Computing and Equal Access for All," Google Inc. 2008 (4 pages).
Shen et al., "Integrating Advanced Collaborative Capabilitites into Web-Based Word Processors," Nauyang Technological University, School of Computer Engineering, Singapore 2007 (8 pages).
Using Adobe Buzzword, 2008, pp. 1-35.
Nasir et al., "Collaborative Report Creation System for Industrial Use," Yamagata University, Graduate School of Science and Engineering; Yamagata, Japan 2009 (6 pages).
Cayenne-McCall, "Synchronous 3D Document Collaboration," Pace University, Department of Computer Science; Nov. 2008. (42 Pages).
Abraham et al., "Mutation Operators for Spreadsheets," Software Engineering, IEEE Transactions on, vol. 35, No. 1, pp. 94,108, Jan.-Feb. 2009 doi: 10.1109/TSE.2008.73 URL: http://ieeexplore.ieee.org/stamp/stamp.jsp?tp=&arnumber=4609389&isnumber=4771845.

* cited by examiner

|   | A | B | C | D | E |
|---|---|---|---|---|---|
| 1 |   |   |   |   |   |
| 2 |   |   |   |   |   |
| 3 |   |   |   |   |   |
| 4 |   |   |   |   |   |
| 5 |   |   |   |   |   |
| 6 |   |   |   |   |   |
| 7 |   |   |   |   |   |
| 8 |   |   |   |   |   |
| 9 |   |   |   |   |   |
| 10 |   |   |   |   |   |
| 11 |   |   |   |   |   |
| 12 |   |   |   |   |   |
| 13 |   |   |   |   |   |
| 14 |   |   |   |   |   |

Rows 1–7: 302
Rows 8–14: 304

| A | Set A2 = 2 |
|---|---|
| B | Set A3 = 4 |
| C | Set B3 = A2+A3 |
| D | Set C10 = A2 x A3 |
| E | Set E9 = B3 + C10 |
| F | Set D1 = 3 |
| G | Set D12 = 7 |
| H | Set A3 = 5 |
| I | Delete Row 6 |
| J | Add Row 11 |
| K | Set E4 = 9 |
| L | Delete D12 |

Snapshot S1 (after E)
Snapshot S2 (after J)

|   | A | B | C | D | E |
|---|---|---|---|---|---|
| 1 |   |   |   | 3 |   |
| 2 | 2 |   |   |   |   |
| 3 | 5 | 7 |   |   |   |
| 4 |   |   |   |   |   |
| 5 |   |   |   |   |   |
| 6 |   |   |   |   |   |
| 7 |   |   |   |   |   |
| 8 |   |   |   |   | 17 |
| 9 |   |   | 10 |   |   |
| 10 |   |   |   |   |   |
| 11 |   |   |   |   |   |
| 12 |   |   |   | 7 |   |
| 13 |   |   |   |   |   |
| 14 |   |   |   |   |   |

DYNAMICALLY SIZING CHUNKS IN A PARTIALLY LOADED SPREADSHEET MODEL

BACKGROUND

Cloud storage systems provide users with the ability to store electronic documents and other files on a remote network rather than on a local computer. This allows users the ability to access the remotely stored files from any device that is capable of connecting with the remote network, for example using a web browser over an Internet connection. Users typically log into an account on the cloud storage system using a username and password. The cloud storage system provides a user interface for users to view, edit, and manage files stored on the system. Cloud storage systems also provide users the ability to share files with other users and to allow collaboration between users on the same file.

One type of file that may be stored in a cloud storage system is a spreadsheet. Spreadsheets are usually arranged as a set of rows and columns that define cells, where each cell may contain data, formulae, or other information. Spreadsheets range in size and larger spreadsheets may contain many rows or columns of information. Typically, when a file from a cloud storage system is loaded onto a client computer the data contents of the entire file are sent from the server to the client computer. For large spreadsheets, the amount of data may range in the megabytes or above. Downloading the information to the client computer may take a long time and may also slow down the rendering process on the client computer. In addition, if a user only wants to edit a certain portion of the spreadsheet, loading the entire spreadsheet onto the client computer wastes time and resources.

SUMMARY

The systems and methods described herein provide a data structure of a spreadsheet in a cloud storage system that may be quickly loaded onto a client computer regardless of the size of the spreadsheet. Only a portion of the spreadsheet may be loaded at a time, with other portions of the spreadsheet loaded as needed by the user. A cloud storage system includes one or more servers for storing files for a user, including spreadsheets. Each spreadsheet is represented by a plurality of chunks, where each chunk encompasses a range of cells in the spreadsheet. The cloud storage system maintains a set of chunks for the spreadsheet. Each user with write access to the spreadsheet may load chunks from the cloud storage system, where they are locally stored. Each client computer can then dynamically change its locally-stored set of chunks independent from the cloud storage system and other users. Any individual chunk in one set of chunks may or may not share the same attributes as any individual chunk in another set of chunks. A mutation log associated with the spreadsheet is stored on the cloud storage system. The mutation log records all mutations, or edits, made to the spreadsheet by a number of users with write access to the spreadsheet. The cloud storage system receives mutations from users, records them in the mutation log, and then broadcasts the mutations to other collaborators. When a user on a client computer requests the display of a range of cells of a spreadsheet stored on the cloud storage system, the cloud storage system applies the mutations stored in the mutation log to one or more of its chunks that span the range of cells of the spreadsheet requested. The cloud storage system sends the updated chunks to the client computer for display. The chunk boundaries for each user may be dynamically adjusted depending on the mutations received from each collaborator. The size of the chunks may be based on the memory and connection capabilities of the client computer associated with the chunks.

One aspect described herein discloses a method for managing a dynamically-sized chunked spreadsheet model on a server. The method includes creating, on the server, a plurality of chunks representing a spreadsheet, where a first chunk in the plurality of chunks includes a first range of cells in the spreadsheet. The method further includes storing on the server a mutation log for the spreadsheet, and receiving a first plurality of mutations from a plurality of client computers, where the first plurality of mutations are stored in the mutation log. The method further includes applying the first plurality of mutations to the first chunk in response to a first client computer in the plurality of client computers requesting the first range of cells, and sending the first chunk to the first client computer.

Another aspect described herein discloses a system for managing a dynamically-sized chunked spreadsheet model, the system including a server. The server is configured to communicate with a plurality of client computers using a communication connection, create a plurality of chunks representing a spreadsheet, where a first chunk in the plurality of chunks includes a first range of cells in the spreadsheet, and store a mutation log for the spreadsheet. The server is further configured to receive a first plurality of mutations from the plurality of client computers, where the first plurality of mutations are stored in the mutation log, apply the first plurality of mutations to the first chunk in response to a first client computer in the plurality of client computers requesting the first range of cells, and send the first chunk to the first client computer over the communication connection.

BRIEF DESCRIPTION OF THE DRAWINGS

The methods and systems may be better understood from the following illustrative description with reference to the following drawings in which.

DETAILED DESCRIPTION

To provide an overall understanding of the systems and methods described herein, certain illustrative embodiments will now be described, including systems and methods for managing a dynamically-sized chunked spreadsheet model on a cloud storage system. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server or system as used in this description may be a single computing device or multiple computing devices working collectively and in which the storage of data and the execution of functions are spread out among the various computing devices.

Aspects of the systems and methods described herein provide a cloud storage system capable of creating, storing, and managing an electronic document with dynamically-sized chunks. An exemplary electronic document that may be represented by dynamically-sized chunks is a spreadsheet, but presentation documents, word processing documents, or other electronic documents may also represented by dynamically-sized chunks. A spreadsheet may be represented by one or more chunks, where each chunk encompasses a range of cells in the spreadsheet. One or more servers hosting a cloud storage system maintains a set of chunks for the spreadsheet. Each user with write access to the spreadsheet may load chunks from the cloud storage system, where they are locally stored. Each client computer can then dynamically change its locally-stored set of chunks independent from the cloud storage system and other users. All chunks are initially empty. A mutation log is associated with the spreadsheet and stored on the server. The mutation log records all mutations made by users to the spreadsheet to any chunk of the spreadsheet. When a user on a client computer requests a range of cells of the spreadsheet from the server, the server applies all the mutations stored in the mutation log to one or more of its chunks representing the range of cells of the spreadsheet requested and sends the copies of the chunks to the client computer. Each chunk is also associated with a dependency graph, which stores the dependencies each cell in the chunk has on other cells. To improve chunk loading performance, snapshots of chunks may be stored and associated with the chunks, where the snapshot captures a chunk at a certain time. This allows the server to only apply mutations occurring after the snapshot rather than starting from an empty chunk. For example, a chunk may be associated with a time-ordered series of snapshots and the cloud storage system utilizes the most recent snapshot to generate an up-to-date version of the chunk. Older snapshots may be used as records of previous versions of the chunk.

Figure 1:
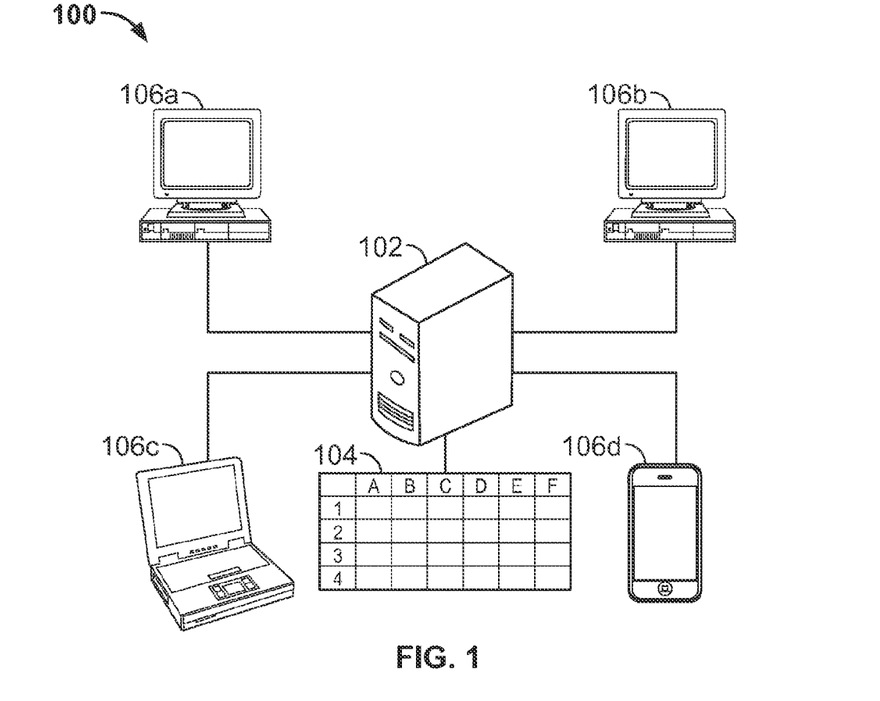
FIG. 1 shows a client-server system for managing a dynamically-sized chunked spreadsheet model in accordance with an implementation as described herein.

A cloud storage system stores files for users and allows users to view, edit, share, and download those files using client computers connected to the cloud storage system over a remote network. One type of file that a cloud storage system may store is a spreadsheet. FIG. 1 illustrates a client-server system, where the server supports a cloud storage system for storing spreadsheets and other files. System 100 includes one or more servers 102 which collectively provide a cloud storage system for storing files such as spreadsheet file 104. System 100 also includes a number of client computers 106a through 106d which connect to servers 102 through a remote network, such as the Internet. Each one of client computers 106a through 106d may be a desktop computer, laptop computer, mobile device, tablet, or any other computing device capable of connecting with servers 102. The remote network connection may be a wired or wireless Internet connection, local area network (LAN), wide area network (WAN), Wi-Fi network, Ethernet, or any other type of known connection.

Figure 2:
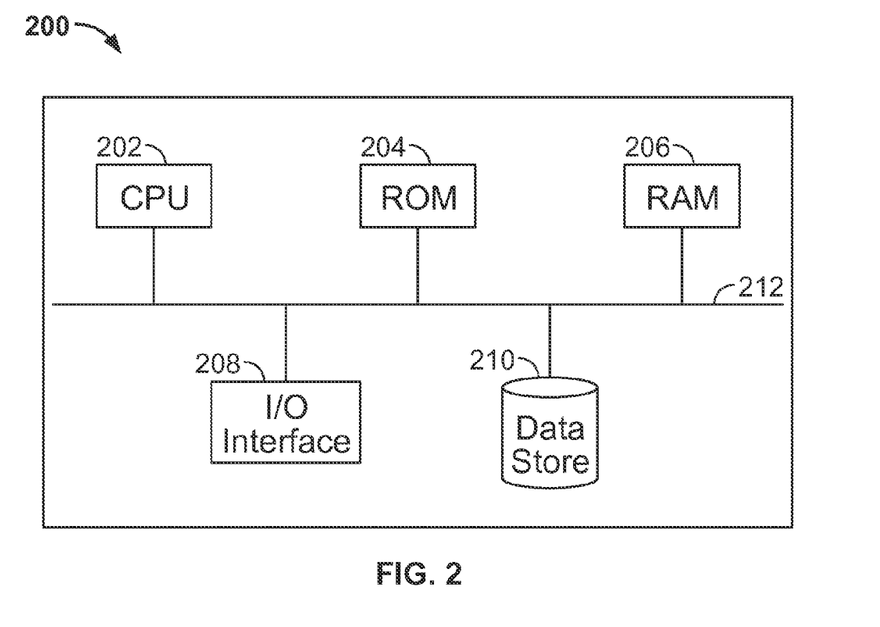
FIG. 2 shows the components of a server configured for managing a dynamically-sized chunked spreadsheet model in accordance with an implementation as described herein.

A cloud storage system may be configured to create and store a spreadsheet model using dynamically-sized chunks. First, a general cloud storage system is described in more detail. Server 200 in FIG. 2 shows an example of a server for use in a cloud storage system. A cloud storage system may include a number of servers that collectively provide the cloud storage service. Server 200 includes a central processing unit (CPU) 202, read only memory (ROM) 204, random access memory (RAM) 206, input/output interface 208, data store 210, and bus 212. Server 200 may have additional components that are not illustrated in FIG. 2. Bus 212 allows the various components of server 200 to communicate with each other. Input/output interface 208 allows the server 200 to communicate with other devices, such as client computers or other servers in the cloud storage system. Data store 210 may store, among other things, files belonging to users of the cloud storage system. Data store 210 also stores dynamically-sized chunks for each user accessing a spreadsheet stored on the server, a dependency graph for each chunk, and a mutation log for each spreadsheet. Users connect with server 200 through input/output interface 208 to access files stored in data store 210.

Data store 210 for providing cloud storage services may be implemented using non-transitory computer-readable media. In addition, other programs executing on server 200 may be stored on non-transitory computer-readable media. Examples of suitable non-transitory computer-readable media include all forms of non-volatile memory, media and memory devices, including, by way of example only, semiconductor memory devices, e.g., EPROM, EEPROM, and flash memory devices; magnetic disks, e.g., internal hard disks or removable disks; magneto-optical disks; and readable, once-writable, or rewriteable CD-ROM and DVD-ROM disks.

Figure 3:
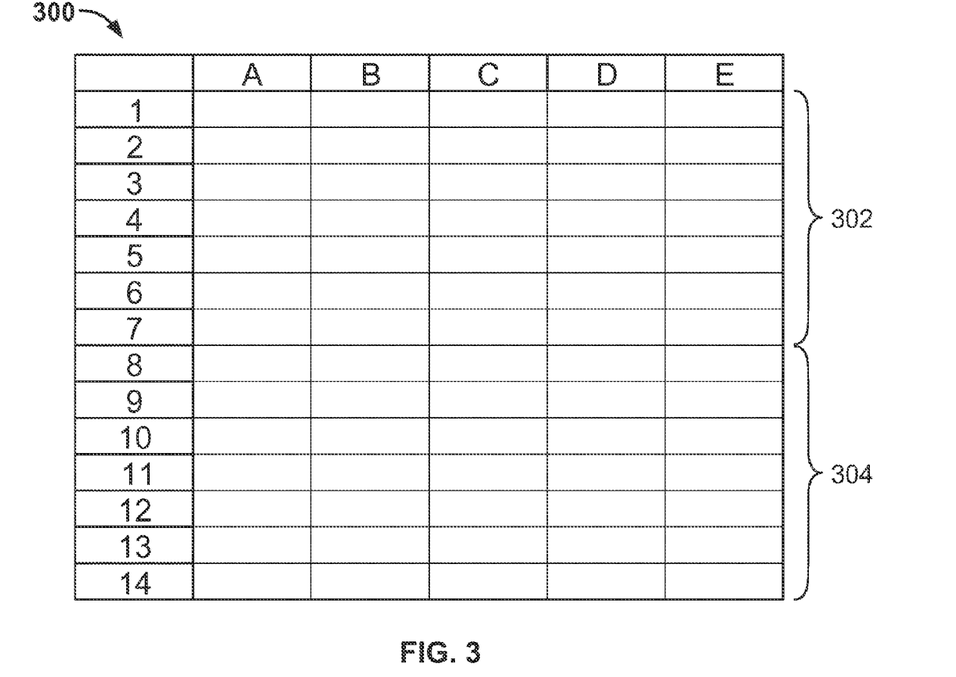
FIG. 3 shows a spreadsheet with dynamically-sized chunks in accordance with an implementation as described herein.

A spreadsheet stored on a cloud storage system may be represented by one or more chunks. FIG. 3 shows an example spreadsheet 300 with dynamically-sized chunks. Spreadsheet 300 as illustrated has rows 1 through 14 and columns A through E, although a spreadsheet may include any number of rows and columns. The cloud storage system may represent the entire spreadsheet 300 using one or more chunks, where each chunk represents a range of cells in the spreadsheet. In FIG. 3, chunk 302 represents rows 1 through 7 and chunk 304 represents rows 8 through 14. Chunks may represent any range of rows, columns, or a combination of rows and column ranges. For example, a chunk may represent the first 1,000 rows of a spreadsheet, the second 1,000 rows of a spreadsheet, the first 1,000 columns of the spreadsheet, or a range of cells covered by rows 1 through 1,000 and columns 100 through 200. For a small spreadsheet with 100 rows and 5 columns, the server may only create one chunk. For a large spreadsheet with 10,000 rows and 20 columns, the server may create 10 chunks, each spanning 1,000 rows. A spreadsheet file may include a number of individual sheets, each having its own tab, arranged in a "workbook" structure. Chunks may be created for each sheet within the spreadsheet file.

The server maintains a master set of chunks for a spreadsheet. Each user with write access to the spreadsheet may load chunks from the cloud storage system, where they are locally stored. Each client computer can then dynamically change its locally-stored set of chunks independent from the cloud storage system and other users. The server may initially set the chunks for each user to be identical, but the size and range of the chunks may be further customized by the client computer and may be based on the capabilities of each client computer that accesses the spreadsheet. For example, if the client computer is a desktop computer with a large cache, the chunk sizes may be large. If the client computer is a tablet or mobile device with smaller memory capabilities, the chunk sizes may be small. The chunk sizes may also be based on the bandwidth of the connection between the client computer and the server. The size and range of the chunks are not static, but may be dynamically changed by the client computer as edits are made to the spreadsheet. For example, if a user adds many rows to a portion of a spreadsheet covered by one chunk, the client computer may split the chunk into two chunks. If a user deletes many rows from a portion of a spreadsheet covered by one chunk, the client computer may merge the reduced chunk with another chunk. If a user adds one or deletes one row in a chunk, the client computer may adjust the boundaries of adjacent chunks. There may be a tolerance range so that repeated insertion and deletion of cells does not repeatedly invoke the merge and split functions, or the boundary adjustment of chunks. The effects of these edits, or mutations, on a chunked spreadsheet model will be discussed in further detail below. Each chunk has an associated ID to uniquely identify it. One of the chunks in the spreadsheet is designated to store metadata information about the entire spreadsheet, such as total number of rows and columns, name of the spreadsheet, chunk IDs, and any other commonly used metadata fields. This chunk may be the first chunk that is normally loaded when a user requests the spreadsheet (e.g. the chunk encompassing row 1 and column 1).

Figure 4:
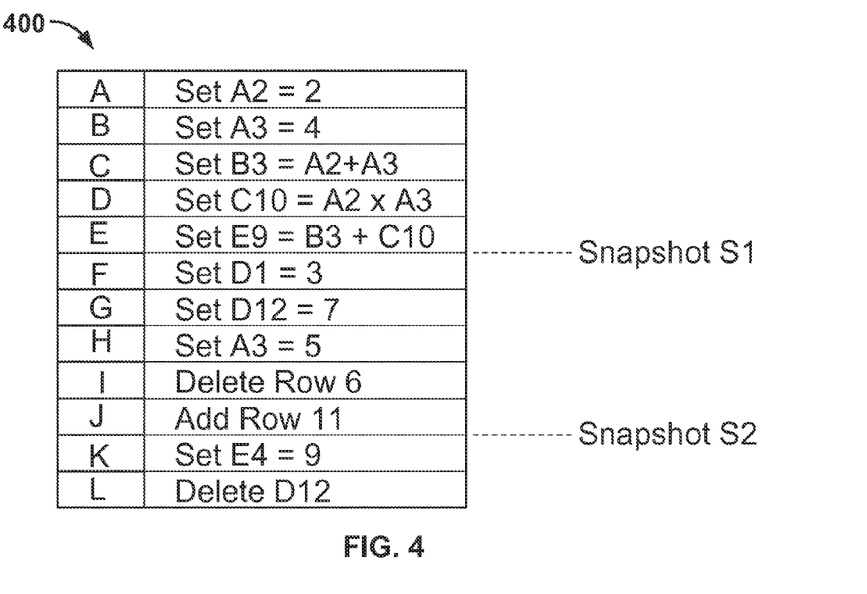
FIG. 4 shows a mutation log for a spreadsheet with dynamically-sized chunks in accordance with an implementation as described herein.

In addition to representing a spreadsheet by one or more dynamically-sized chunks, a mutation log is associated with the spreadsheet. FIG. 4 shows an example of a mutation log 400. The mutation log may apply to all chunks of a spreadsheet, so only one log is stored per spreadsheet. Alternatively, each chunk of the spreadsheet may have an associated mutation log. Mutation log 400 stores mutations, or edits, that all users with write access to the spreadsheet send to the cloud storage system, in the order in which they are received. The cloud storage system stores the mutations and also propagates the mutations to each collaborator that is also working on the same spreadsheet. These edits may be to set the value of cells, delete cell values, enter formulae into cells, cut, copy or paste values, add or delete rows and columns, sorting row or column values, filtering row or column values, linking to external data, performing a calculation, or any other operation permissible in an electronic spreadsheet. For example, mutation log 400 stores a number of set value commands, such as "Set A2=2" for mutation A, "Set A3=4" for mutation B, and "Set B3=A2+A3" for mutation C. Mutation log 400 may also store row addition and deletion mutations, such as "Delete Row 6" for mutation I and "Add Row 11" for mutation J. Other mutations not shown in FIG. 4 may also be stored in mutation log 400. In case of conflicting mutations or mutations that occur at the same time, the server may engage various conflict resolution mechanisms to determine the proper order of mutations. The mutations correlate directly to cells, rows or columns, without regard to chunks. This allows the size and range of chunks to change without affecting mutation log 400. The cloud storage system may assign a revision number to each mutation received. The syntax of the mutations is not limited to that shown in FIG. 4 but may encompass any known spreadsheet syntax.

FIG. 4 also shows two snapshots, one taken after mutation E and one taken after mutation J. Snapshots are copies of a chunk generated at a certain time with all the mutations occurring before that time incorporated into the chunk. For example, snapshot S1 of a chunk incorporates mutations A-E while snapshot S2 of a chunk incorporates mutations A-J. Snapshots are created by the cloud storage system to lessen the time it takes to load a chunk to a user. For example, when a user requests a chunk from a cloud storage system after mutation G has been entered, the cloud storage system takes an empty initial copy of the chunk and applies mutations A-G stored in mutation log 400 to the empty chunk to obtain the current state of the chunk, and then sends the chunk to the client computer. If the cloud storage system has created and stored snapshot S1, then it only needs to apply mutations F and G to snapshot S1 of the chunk before sending the copy to the client computer.

Figure 5:
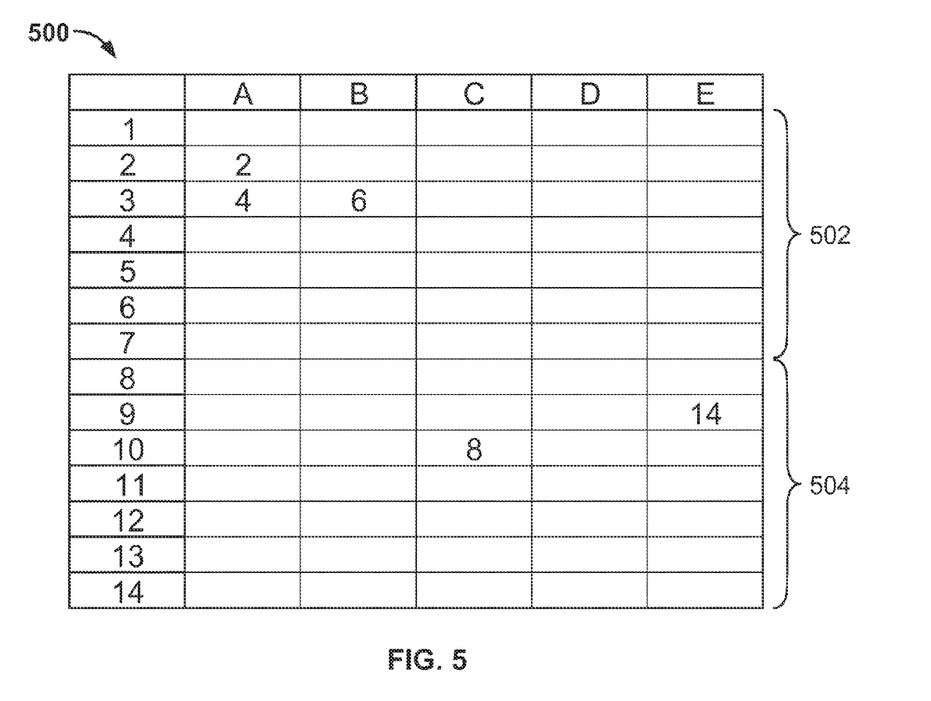
FIG. 5 shows another spreadsheet with dynamically-sized chunks in accordance with an implementation as described herein.

When a spreadsheet is first generated in a cloud storage system, one or more chunks are created that represent the spreadsheet. Initially, all the cells in every chunk have no value (i.e. the spreadsheet is empty), such as shown in FIG. 3. As the cloud storage system receives mutations for the spreadsheet from any number of users, the mutations are stored in a mutation log associated with the spreadsheet, such as shown in FIG. 4. The cloud storage system also sends each mutation to the other collaborators who are working on the same spreadsheet, either individually or in batches. When a client computer requests a range of cells of the spreadsheet encompassed by a chunk, the cloud storage system applies all the mutations received up to that point and applies it to an empty version of the chunk (or a snapshot if one has been created). After all the mutations have been applied, a copy of the chunk is sent to the client computer. For example, mutation log 400 depicted in FIG. 4 is associated with empty spreadsheet 300 in FIG. 3. One or more users send mutations A-E shown in FIG. 4 to the cloud storage system. The cloud storage system stores these mutations in mutation log 400. Then a user on a client computer requests a copy of chunk 302 or chunk 304 of spreadsheet 300. Alternatively, the cloud storage system may save a snapshot of both chunks after mutation E has occurred, such as snapshot S1 illustrated in FIG. 4. In either situation, spreadsheet 500 shown in FIG. 5 depicts the current state of both chunks after mutation E. The client computer stores the copy of the chunk received from the cloud storage system in local memory. The server sends the client computer mutations made by other collaborators on the spreadsheet, which are applied to the chunk at the client computer. If the client computer requires additional portions of the spreadsheet to be loaded, the client computer makes additional chunk requests to the cloud storage system.

Spreadsheet 500 includes chunk 502 and chunk 504, which correspond to chunks 302 and 304 respectively in FIG. 3, but shown after mutations A-E from mutation log 400 have been applied to the chunks. Mutation A, "Set A2=2", is applied to both chunk 502 and chunk 504. Cell A2 is found in chunk 502 and so it is set to the value "2", as illustrated. Chunk 504 does not include cell A2, so the application of mutation A to chunk 504 results in a null effect. Mutation B, "Set A3=4", is also applied to both chunks but has no effect on chunk 504 because cell A3 is located in chunk 502. Likewise with mutation C, which sets cell B3=A2+A3. Mutations D and E, however, produce a change in chunk 504 but no change in chunk 502. After mutations A-E are applied to chunks 502 and 504, cell A2 has the value "2", cell A3 has the value "4", cell B3 has the value "6" (A2+A3), cell C10 has the value "8" (A2×A3), and cell E9 has the value "14" (B3+C10).

Figure 6:
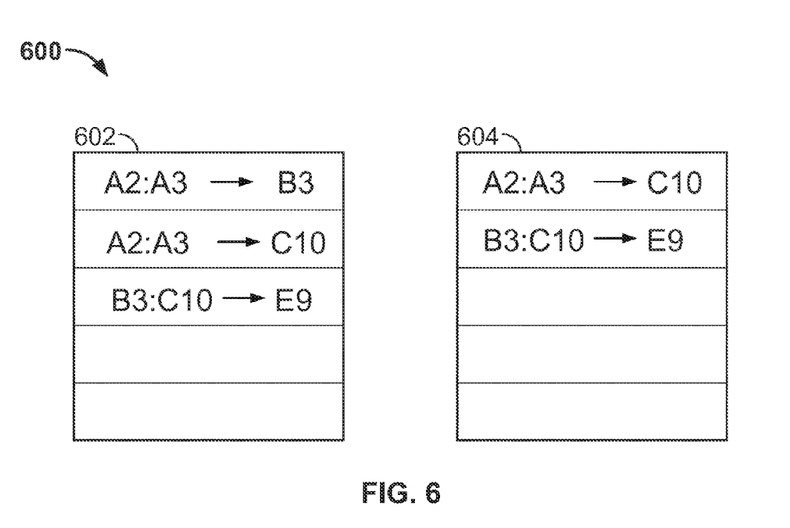
FIG. 6 shows a dependency graph for a spreadsheet with dynamically-sized chunks in accordance with an implementation as described herein.

Each chunk is associated with a dependency graph which records any dependent relationships of cells within the chunk with other cells, either within the same chunk or in a different chunk. FIG. 6 shows two such dependency graphs, graph 602 associated with chunk 502 and graph 604 associated with chunk 504. When the cloud storage system receives a mutation from a user, the cloud storage system applies the mutations to the dependency graphs for each chunk to ensure that relationships between cells are properly preserved. Thus mutations A-E in mutation log 400 are applied to chunks 502 and 504 as well as to graphs 602 and 604. For example, mutation C specifies that the value of cell B3 in chunk 502 depends on the values of cells A2 and A3 and so it is recorded in graph 602 as "A2:A3→B3". In chunk 504, the values of cells C10 and E9 depend on the values of other cells in both chunk 502 and chunk 504, so the dependency relationship for both cells is recorded in both graphs 602 and 604. The structure and syntax of dependency graphs 600 is not limited to what is shown in FIG. 6 but may encompass any known structure and syntax for expressing relationships between spreadsheet cells. For example, the dependency graphs may be stored as an R-tree. When a user requests a chunk to be loaded on the user's client computer, the cloud storage system applies all the mutations to chunk and to its corresponding dependency graph and sends the chunk and the dependency graph to the client computer. The client computer queries the dependency graph to determine if any cells are dependent on cells in other chunks. The client computer may already have copies of the other chunks that are necessary to determine the cell values stored in local memory, but if the client computer does not have one or more necessary chunks, the client computer requests those chunks from the cloud storage system. The cloud storage system applies the mutations in the mutation log to those chunks and sends them to the client computer. Once the client computer has all the chunks necessary to determine the value of the cells in the first chunk, the client computer calculates the actual cell values for the chunk.

Figure 7:
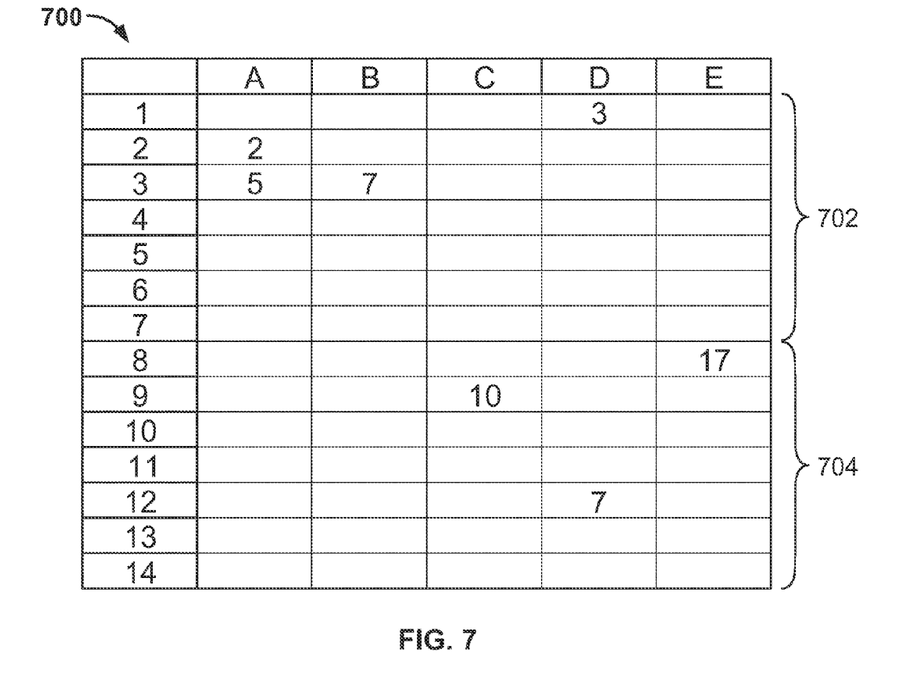
FIG. 7 shows another spreadsheet with dynamically-sized chunks in accordance with an implementation as described herein.

At a later time after mutations A-E were received, the cloud storage system receives mutations F-J for the spreadsheet and records the mutations in mutation log 400. Spreadsheet 700 in FIG. 7 shows the state of chunks 702 and 704 (which correspond to chunks 302 and 304 respectively) after mutations A-J have been applied. For example, spreadsheet 700 may represent a snapshot of chunks 702 and 704 taken after mutation J has been received (snapshot S2 in FIG. 4), or a client computer may request a version of spreadsheet 700 after mutation J has been received and the cloud storage system returns chunks 702 and 704. The cloud storage system may start with empty chunks 302 and 304 and apply mutations A-J to derive chunks 702 and 704. Alternatively, if a snapshot of the chunks exists, the cloud storage system may start with the snapshots and apply only the mutations that are received after the snapshots. For example, chunks 502 and 504 may represent snapshots of the chunks after mutation E. When a client computer requests either chunk 702 or 704 after mutation J has been received, the cloud storage system applies mutations F-J to snapshot chunks 502 or 504 and returns chunk 702 or 704, respectively.

Mutations F, G, and H in mutation log 400 are set value mutations and are applied to both chunk 702 and chunk 704, producing a null effect in any chunks which are not affected by the mutations. Thus the value of cell D1 is set to "3", the value of D12 is set to "12", and the value of A3 is set to "5". Mutation I deletes row 6 of spreadsheet 700. When a row is deleted, the boundaries of chunks may change. For example, because row 6 was within chunk 702 before it was deleted, chunk 702 encompasses new rows 1-6 after the deletion of row 6 rather than rows 1-7 as originally defined. All rows below row 6 are shifted up one row. Thus chunk 704 now encompasses rows 7 through 13 and all the cell values in chunk 704 are shifted up one row. Mutation J inserts a new row as row 11, which affects chunk 704 but not chunk 702. Chunk 704 now encompasses rows 7 through 14 and the values of any cells at or below old row 11 are shifted down one row. After mutation J has been applied, the value of cell C9 in chunk 704 is now set as A2×A3. C10 was originally set to this value, but the deletion of row 6 shifted the value up one row to C9. Likewise, the original value of E9(B3+C10) has been shifted to E8. The value of D12 was originally set to "12", was shifted up one row by the deletion of row 6, and then shifted down one row by the addition of row 1. Thus cell D12 still contains the value "12".

Figure 8:
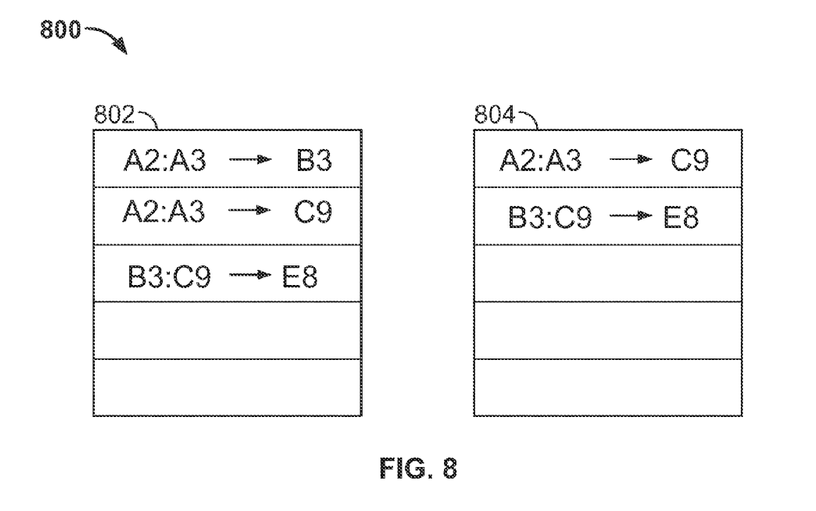
FIG. 8 shows another dependency graph for a spreadsheet with dynamically-sized chunks in accordance with an implementation as described herein.

Dependency graphs 802 and 804 in FIG. 8 show the dependency relationships for cells in chunks 702 and 704 respectively. Mutations F-J, in addition to being applied to the chunks, are also applied to graphs 802 and 804. Both graphs have been affected by the row deletions and additions. For example, cell C9 rather than cell C10 depends on cells A2 and A3 because of the deletion of row 6. Likewise, cell E8 rather than cell E9 depends on cells B3 and C9 because of the deletion of row 6. Once dependency graphs 800 are updated with the mutations, the cloud storage system may send the dependency graphs along with a copy of the chunks when requested by a user. In this manner, FIGS. 3 through 8 show the operation of dynamically-sized chunks for a spreadsheet model implemented in a cloud storage system.

Figure 9:
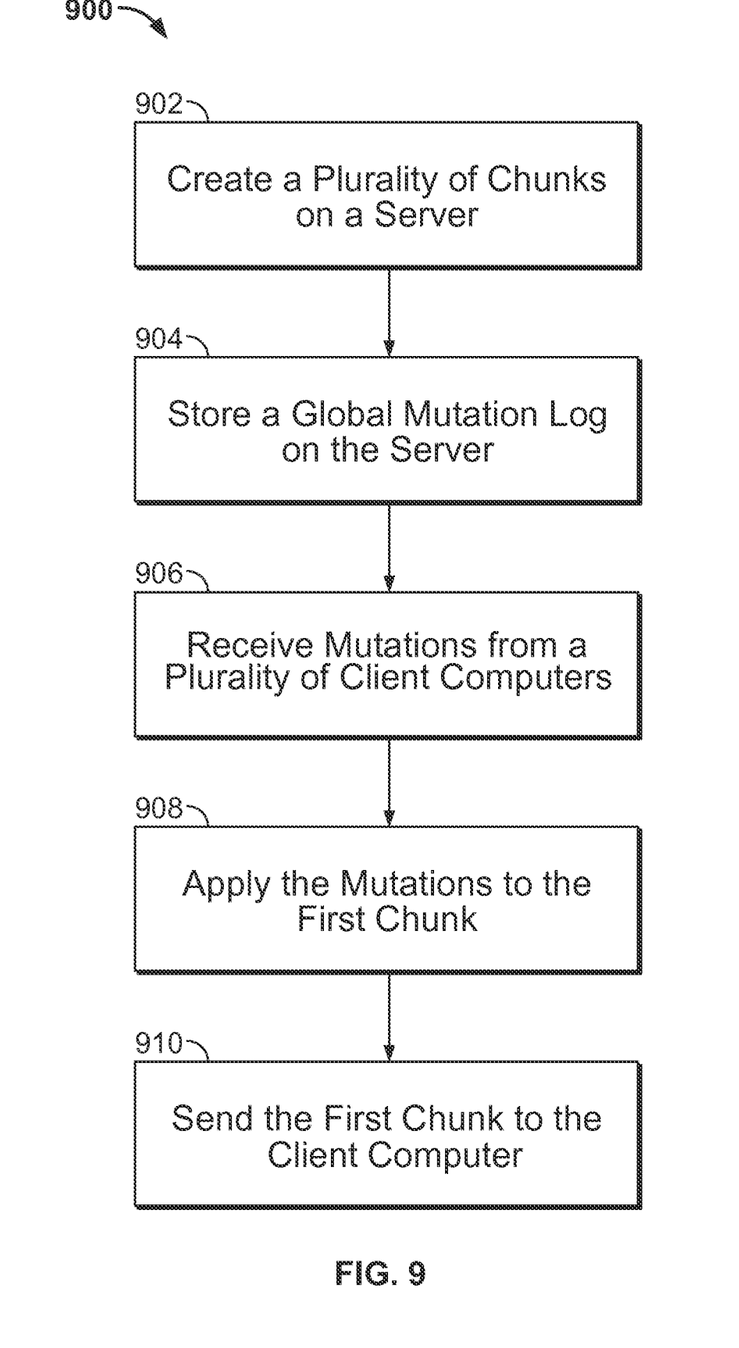
FIG. 9 shows a method for managing a dynamically-sized chunked spreadsheet model in accordance with an implementation as described herein.

Methods for creating, storing, and delivering a dynamically-sized chunked spreadsheet model on a cloud storage system are now described. One method for managing a dynamically-sized chunked spreadsheet model on a server is illustrated in FIG. 9. Method 900 includes creating, on the server, a plurality of chunks representing a spreadsheet, where a first chunk in the plurality of chunks includes a first range of cells in the spreadsheet. The method further includes storing on the server a mutation log for the spreadsheet, and receiving a first plurality of mutations from a plurality of client computers, where the first plurality of mutations are stored in the mutation log. The method further includes applying the first plurality of mutations to the first chunk in response to a first client computer in the plurality of client computers requesting the first range of cells, and sending the first chunk to the first client computer.

Method 900 begins when a server hosting a cloud storage system creates a spreadsheet, the spreadsheet including one or more chunks, illustrated at 902. One or more servers such as server 200 in FIG. 2 may host the cloud storage system. This may be in response to a user saving a spreadsheet on the cloud storage system. Each chunk represents a range of cells in the spreadsheet, such as chunks 302 and 304 in spreadsheet 300 shown in FIG. 3. For example, a chunk may represent a number of rows in the spreadsheet, or a number of columns in a spreadsheet. The spreadsheet file may be a workbook that includes a number of separate sheets and chunks are created for each sheet in the workbook. The spreadsheet may initially have only one chunk if the spreadsheet is empty. The server designates one chunk to store metadata information about the entire spreadsheet, such as total number of rows and columns, name of the spreadsheet, chunk IDs, and any other commonly used metadata fields. The server maintains a set of chunks for the spreadsheet. Each user with write access to the spreadsheet may load chunks from the cloud storage system, where they are locally stored. Each client computer can then dynamically change its locally-stored set of chunks independent from the cloud storage system and other users. Thus changes to the size and boundaries of one user's chunks do not affect the size or boundaries other users' chunks. For example, different users may be on client computers with different memory and connection capabilities and the client computer may optimize the chunk size for each client computer. The chunks are stored on the server in lieu of the full spreadsheet.

After a plurality of chunks for a spreadsheet are created, the server stores a mutation log associated with the spreadsheet, illustrated at 904. The mutation log records all mutations, or edits, made by users with write access to the spreadsheet. Mutation log 400 shown in FIG. 4 is an example of a mutation log stored on the server. The server receives a plurality of mutations from one or more users using client computers to work on the spreadsheet, illustrated at 906. Mutations may include commands to set cell values, commands to insert or delete rows or columns, cut, copy, and past commands, filtering row or column values, linking to external data, performing a calculation, and any other standard spreadsheet operations. The server may dynamically modify the range of cells of a chunk based on one or more of the mutations. For example, the server may adjust chunk row boundaries if it receives insert or delete row commands. The mutation log records all mutations in the order in which they are received. In case of conflicting mutations or mutations that occur at the same time, the server may engage various conflict resolution mechanisms to determine the proper order of mutations. The server also sends each received mutation to other collaborators who are also working on the spreadsheet. The mutations stored in the mutation log do not have any chunk information associated with them—they are independent of the chunks. This allows the mutations to be stored on a single mutation log applicable to all chunks. The mutations are not automatically applied to the chunks when they are received, but rather are stored in the mutation log. Each chunk may also have an associated dependency graph, which records the relationships cells within the chunk have with other cells. The plurality of mutations are applied to the dependency graph of each chunk so that the dependency relationships are up-to-date. Examples of dependency graphs in include graphs 602 and 604 shown in FIG. 6 and graphs 802 and 804 shown in FIG. 8.

After a plurality of mutations are received by the server and stored in the mutation log, the server receives a request from a user on a client computer to send the client computer a copy of a range of cells of the spreadsheet, illustrated at 908. For example, this may occur when a client computer requests a range of cells of the spreadsheet encompassed by a first chunk of which the client computer does not currently have a copy. When the request is received by the server, the server applies all the mutations stored in the mutation log to the first chunk on the server in the order in which they are stored. The chunk may initially be empty, so the mutations represent all the edits made by all users to that chunk of the spreadsheet. When all the mutations have been applied, the chunk is up-to-date with all user edits. For example, spreadsheet 500 in FIG. 5 shows up-to-date chunks 502 and 504 after mutations 1-5 listed in mutation log 400 have been applied to the chunk. The server then sends the up-to-date chunk to the client computer, illustrated at 910. If the client computer requests another range of cells of the spreadsheet encompassed by another chunk, the server applies the plurality of mutations to this additional chunk and sends it to the client computer. If the client computer requests a range of cells of the spreadsheet encompassed by multiple chunks, the server applies the plurality of mutations to all the necessary chunks and sends them to the client computer. Unless there are snapshots of the chunk available, the server applies all of the plurality of mutations to any chunk when that chunk is requested by the client computer. In this manner, the server provides a method for managing a dynamically-sized chunked spreadsheet model.

Figure 10:
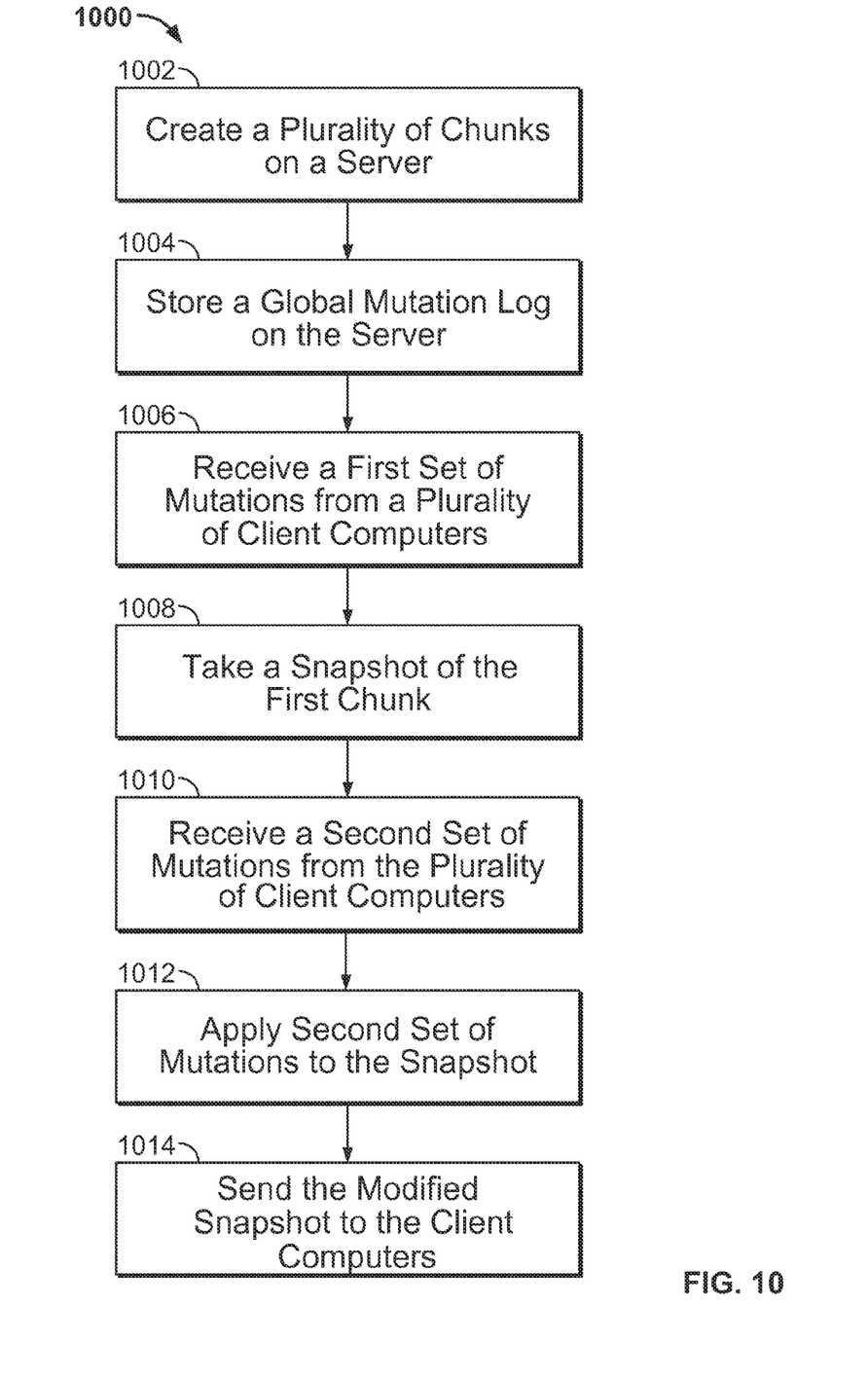
FIG. 10 shows another method for managing a dynamically-sized chunked spreadsheet model in accordance with an implementation as described herein.

Another method for managing a dynamically-sized chunked spreadsheet model on a server may use snapshots of chunks to decrease the time it takes to generate a chunk for sending to a client computer, as illustrated in FIG. 10. Method 1000 includes creating, on the server, a first plurality of chunks representing a spreadsheet, where a first chunk in the plurality of chunks includes a first range of cells in the spreadsheet, and storing on the server a mutation log for the spreadsheet. The method further includes receiving a first plurality of mutations from a plurality of client computers, where the first plurality of mutations are stored in the mutation log, and storing a snapshot of the first chunk, where the first plurality of mutations are applied to the first chunk to obtain the snapshot. The method further includes receiving a second plurality of mutations from the plurality of client computers, where the second plurality of mutations are stored in the mutation log. The method further includes applying the second plurality of mutations to the snapshot to obtain a modified snapshot in response to a first client computer in the plurality of client computers requesting the first range of cells, and sending the modified snapshot to the first client computer.

Method 1000 begins when a server hosting a cloud storage system creates a spreadsheet, the spreadsheet including one or more chunks, illustrated at 1002. One or more servers such as server 200 in FIG. 2 may host the cloud storage system. This may be in response to a user saving a spreadsheet on the cloud storage system. Each chunk represents a range of cells in the spreadsheet, such as chunks 302 and 304 in spreadsheet 300 shown in FIG. 3. For example, a chunk may represent a number of rows in the spreadsheet, or a number of columns in a spreadsheet. The spreadsheet file may be a workbook that includes a number of separate sheets and chunks are created for each sheet in the workbook. The spreadsheet may initially have only one chunk if the spreadsheet is empty. The server designates one chunk to store metadata information about the entire spreadsheet, such as total number of rows and columns, name of the spreadsheet, chunk IDs, and any other commonly used metadata fields. The server maintains a set of chunks for the spreadsheet. Each user with write access to the spreadsheet may load chunks from the cloud storage system, where they are locally stored. Each client computer can then dynamically change its locally-stored set of chunks independent from the cloud storage system and other users. Thus changes to the size and boundaries of one user's chunks do not affect the size or boundaries other users' chunks. For example, different users may be on client computers with different memory and connection capabilities and the client computer may optimize the chunk size for each client computer. The chunks are stored on the server in lieu of the full spreadsheet.

After a plurality of chunks for a spreadsheet are created, the server stores a mutation log associated with the spreadsheet, illustrated at 1004. The mutation log records all mutations, or edits, made by users with write access to the spreadsheet. Mutation log 400 shown in FIG. 4 is an example of a mutation log stored on the server. The server receives a first plurality of mutations from one or more users using client computers to work on the spreadsheet, illustrated at 1006. Mutations may include commands to set cell values, commands to insert or delete rows or columns, cut, copy and paste commands, filtering row or column values, linking to external data, performing a calculation, and any other standard spreadsheet operations. The server may dynamically modify the range of cells of a chunk based on one or more of the mutations. For example, the server may adjust chunk row boundaries if it receives insert or delete row commands. The mutation log records all mutations in the order in which they are received. In case of conflicting mutations or mutations that occur at the same time, the server may engage various conflict resolution mechanisms to determine the proper order of mutations. The server also sends each received mutation to other collaborators who are also working on the spreadsheet. The mutations stored in the mutation log do not have any chunk information associated with them—they are independent of the chunks. This allows the mutations to be stored on a single mutation log applicable to all chunks. The mutations are not automatically applied to the chunks when they are received, but rather are stored in the mutation log. Each chunk may also have an associated dependency graph, which records the relationships cells within the chunk have with other cells. The first plurality of mutations is applied to the dependency graph of each chunk so that the dependency relationships are up-to-date. Examples of dependency graphs in include graphs 602 and 604 shown in FIG. 6 and graphs 802 and 804 shown in FIG. 8.

After the first plurality of mutations are received by the server and stored in the mutation log, the server stores a snapshot of a first chunk, illustrated at 1008. A snapshot captures the state of the first chunk after the first plurality of mutations are applied to the first chunk. For example, chunks 502 and 504 in FIG. 5 may be snapshots of chunks 302 and 304 respectively taken after the server receives mutations A-E listed in mutation log 400. The server takes a copy of the first chunk and applies the first plurality of mutations to obtain the snapshot. The snapshot is stored on the server and associated with the first chunk. The snapshot allows the server to decrease the amount of time necessary to generate an up-to-date version of the first chunk when a client computer requests a copy of the hunk. After the snapshot has been stored, the server receives an additional second plurality of mutations from the one or more client computers, illustrated at 1010. The second plurality of mutations are also stored in the mutation log. For example, mutations F-J listed in mutation log 400 shown in FIG. 4 may be received after the server takes a snapshot incorporating mutations A-E. The second plurality of mutations are applied to the dependency graph of each chunk so that the dependency relationships are up-to-date.

After the second plurality of mutations are received by the server and stored in the mutation log, the server receives a request from a user on a client computer to send the client computer the first chunk, illustrated at 1012. For example, this may occur when a client computer requests a range of cells of the spreadsheet encompassed by the first chunk.

When the request is received by the server, the server applies the second plurality of mutations stored in the mutation log to the snapshot. Applying only the second plurality of mutations to the snapshot takes less time than applying both the first and second plurality of mutations to the initial first chunk. Both processes would lead to the same result. A modified snapshot is obtained after the second plurality of mutations have been applied to the snapshot. For example, mutations F-J listed in mutation log 400 may be applied to snapshot 502 in FIG. 5, where snapshot 502 already incorporates mutations A-E. The result is modified snapshot 702 shown in FIG. 7, which may also be obtained if mutations A-J were applied to empty chunk 302 in FIG. 3. The server sends the modified snapshot to the client computer, illustrated at 1014. The server may take additional snapshots of the first chunk as more mutations are received. If a client computer requests a copy of the first chunk, the server takes the most recent snapshot of the first chunk and only applies mutations received after that snapshot was stored. The server sends this modified snapshot to the client computer. Because each client computer maintains separate sets of chunks, each chunk within each set may have one or more snapshots associated with it. In this manner, the server provides a method for managing a dynamically-sized chunked spreadsheet model using snapshots to decrease the time to deliver chunks to a client computer.

It will be apparent that aspects of the systems and methods described herein may be implemented in many different forms of software, firmware, and hardware in the implementations illustrated in the figures. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:
1. A method for managing a dynamically-sized chunked spreadsheet model on a server, the method comprising:
  creating, on the server, a plurality of chunks representing a spreadsheet, wherein a first chunk in the plurality of chunks comprises a first range of cells in the spreadsheet;
  storing on the server a mutation log for the spreadsheet;
  receiving a first plurality of mutations from a plurality of client computers, wherein the first plurality of mutations are stored in the mutation log;
  applying the first plurality of mutations to the first chunk in response to a first client computer in the plurality of client computers requesting the first range of cells;
  modifying the range of cells that comprise the first chunk based on the first plurality of mutations, wherein:
    when at least one of the plurality of mutations comprises deleting at least one row from a portion of the spreadsheet covered by the first chunk, determining whether the application of the at least one of the plurality of mutations reduces the size of the first chunk below a predetermined threshold, and merging the first chunk with a different chunk from the plurality of chunks, or, when at least one of the plurality of mutations comprises adding at least one row to a portion of the spreadsheet covered by the first chunk, determining whether the application of the at least one of the plurality of mutations increases the size of the first chunk above the predetermined threshold, and splitting the first chunk into two chunks; and sending the first chunk to the first client computer.

2. The method of claim 1, wherein a second chunk in the plurality of chunks comprises a second range of cells in the spreadsheet, the method further comprising:

applying the first plurality of mutations to the second chunk in response to the first client computer requesting the second range of cells; and sending the second chunk to the first client computer.

3. The method of claim 2, wherein the first client computer requests the first and second range of cells at the same time.

4. The method of claim 1, wherein the range of cells of the first chunk is a range of rows in the spreadsheet.

5. The method of claim 1, wherein a first mutation in the first plurality of mutations is selected from the group consisting of a cut command, a copy command, a paste command, a set value command, an insert row command, a delete row command, an insert column command, a delete column command, a filter command, a sort command, an external link command, and a calculation command.

6. The method of claim 1, wherein the first chunk is associated with a dependency graph.

7. The method of claim 6, wherein receiving the first plurality of mutations includes applying the first plurality of mutations to the dependency graph.

8. The method of claim 6, wherein the dependency graph is sent to the first client computer along with the first chunk.

9. The method of claim 1, the method further comprising:

storing a snapshot of the first chunk, wherein the first plurality of mutations are applied to the first chunk to obtain the snapshot;

receiving a second plurality of mutations from the plurality of client computers, wherein the second plurality of mutations are stored in the mutation log;

applying the second plurality of mutations to the snapshot to obtain a modified snapshot in response to the first client computer requesting the first range of cells;

modifying the range of cells that comprise the first chunk based on the second plurality of mutations, wherein:

when at least one of the plurality of mutations comprises deleting at least one row from a portion of the spreadsheet covered by the first chunk, determining whether the application of the at least one of the plurality of mutations reduces the size of the first chunk below a predetermined threshold, and merging the first chunk with a different chunk from the plurality of chunks, or, when at least one of the plurality of mutations comprises adding at least one row to a portion of the spreadsheet covered by the first chunk, determining whether the application of the at least one of the plurality of mutations increases the size of the first chunk above the predetermined threshold, and splitting the first chunk into two chunks; and sending the modified snapshot to the first client computer.

10. The method of claim 1, wherein each client computer in the plurality of client computers maintain separate sets of the plurality of chunks.

11. The method of claim 1, wherein each mutation in the first plurality of mutations does not include any information about the plurality of chunks.

12. A system for managing a dynamically-sized chunked spreadsheet model, the system comprising:

a server, wherein the server is configured to:

communicate with a plurality of client computers using a communication connection;

create a plurality of chunks representing a spreadsheet, wherein a first chunk in the plurality of chunks comprises a first range of cells in the spreadsheet;

store a mutation log for the spreadsheet;

receive a first plurality of mutations from the plurality of client computers, wherein the first plurality of mutations are stored in the mutation log;

apply the first plurality of mutations to the first chunk in response to a first client computer in the plurality of client computers requesting the first range of cells;

modify the range of cells that comprise the first chunk based on the first plurality of mutations, wherein:

when at least one of the plurality of mutations comprises deleting at least one row from a portion of the spreadsheet covered by the first chunk, determine whether the application of the at least one of the plurality of mutations reduces the size of the first chunk below a predetermined threshold, and merge the first chunk with a different chunk from the plurality of chunks, or, when at least one of the plurality of mutations comprises adding at least one row to a portion of the spreadsheet covered by the first chunk, determine whether the application of the at least one of the plurality of mutations increases the size of the first chunk above a predetermined threshold, and split the first chunk into two chunks; and send the first chunk to the first client computer over the communication connection.

13. The system of claim 12, wherein a second chunk in the plurality of chunks comprises a second range of cells in the spreadsheet, and wherein the server is further configured to:

apply the first plurality of mutations to the second chunk in response to the first client computer requesting the second range of cells; and send the second chunk to the first client computer.

14. The system of claim 13, wherein the first client computer requests the first and second range of cells at the same time.

15. The system of claim 12, wherein the range of cells of the first chunk is a range of rows in the spreadsheet.

16. The system of claim 12, wherein a first mutation in the first plurality of mutations is selected from the group consisting of a cut command, a copy command, a paste command, a set value command, an insert row command, a delete row command, an insert column command, a delete column command, a filter command, a sort command, an external link command, and a calculation command.

17. The system of claim 12, wherein the first chunk is associated with a dependency graph.

18. The system of claim 17, wherein the server is further configured to apply the first plurality of mutations to the dependency graph.

19. The system of claim 17, wherein the dependency graph is sent to the first client computer along with the first chunk.

20. The system of claim 12, wherein the server is further configured to:
- store a snapshot of the first chunk, wherein the first plurality of mutations are applied to the first chunk to obtain the snapshot;
- receive a second plurality of mutations from the plurality of client computers, wherein the second plurality of mutations are stored in the mutation log;
- apply the second plurality of mutations to the snapshot to obtain a modified snapshot in response to the first client computer requesting the first range of cells;
- modify the range of cells that comprise the first chunk based on the second plurality of mutations, wherein:
  - when at least one of the plurality of mutations comprises deleting at least one row from a portion of the spreadsheet covered by the first chunk, determine whether the application of the at least one of the plurality of mutations reduces the size of the first chunk below a predetermined threshold, and merge, the first chunk with a different chunk from the plurality of chunks, or,
  - when at least one of the plurality of mutations comprises adding at least one row to a portion of the spreadsheet covered by the first chunk, determine whether the application of the at least one of the plurality of mutations increases the size of the first chunk above a predetermined threshold, and split the first chunk into two chunks; and
- send the modified snapshot to the first client computer over the communication network.

21. The system of claim 12, wherein each client computer in the plurality of client computers maintain separate sets of the plurality of chunks.

22. The system of claim 12, wherein each mutation in the first plurality of mutations does not include any information about the plurality of chunks.

* * * * *